Aug. 30, 1966   F. WILOTH ETAL   3,269,990
PROCESS FOR THE CONTINUOUS POLYCONDENSATION OF
DICARBOXYLIC ACIDS AND DIAMINES OR THEIR SALTS
Filed April 25, 1962
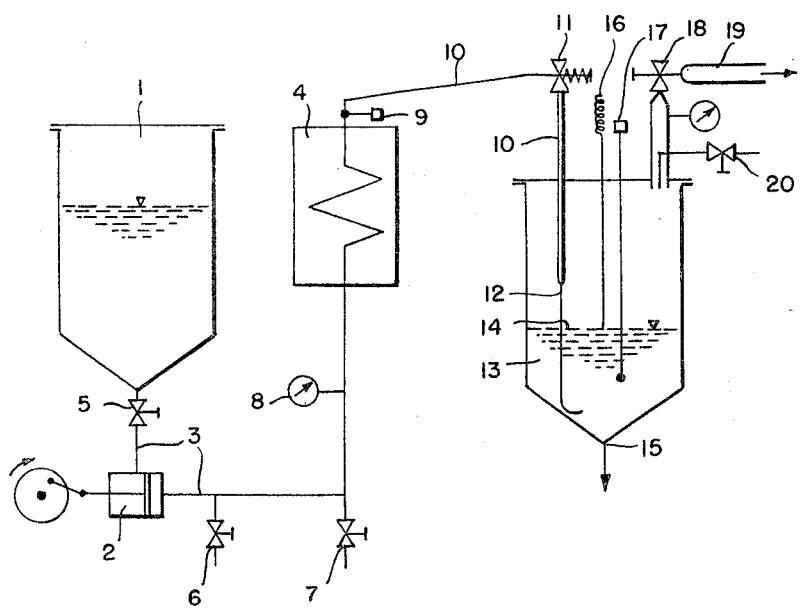
INVENTORS:
FRITZ WILOTH
HANS-MARTIN KOEPP
BY Margall, Johnston
Cook & Root
ATT'YS

United States Patent Office 3,269,990
Patented August 30, 1966

3,269,990
PROCESS FOR THE CONTINUOUS POLYCONDENSATION OF DICARBOXYLIC ACIDS AND DIAMINES OR THEIR SALTS
Fritz Wiloth, Klingenberg (Main), and Hans-Martin Koepp, Obernburg (Main), Germany, assignors to Vereinigte Glanzstoff-Fabriken AG., Wuppertal-Elberfeld, Germany
Filed Apr. 25, 1962, Ser. No. 197,810
Claims priority, application Germany, Apr. 26, 1961, V 20,564
4 Claims. (Cl. 260—78)

This invention, in general, relates to continuous processes for the polycondensation of dicarboxylic acids and diamines or salts of dicarboxylic acids and diamines.

In the production of polyamides from dicarboxylic acids and diamines, it is usual to start with aqueous solutions of the salts of these monomers, for example, the adipic acid hexamethylene diamine salt. The solutions are heated in a first stage under a pressure of about 18 atmospheres gauge pressure to temperature over 200° C. The use of pressure is necessary in order to prevent a solidification of the condensing reaction mass and to avoid losses of hexamethylene diamine. In this first stage a relatively large amount of the solution water is vaporized, but there remains, retained by the pressure, such a great percentage of water in the melt that the condensation cannot be conducted to its conclusion. For the further processing, therefore, the melt formed in the first stage must be brought to atmospheric pressure and further heated until the desired degree of polymerization is achieved. The greater the amount of water still contained in the melt is, the more difficult is the pressure release to atmospheric pressure, because the heat of vaporization required for a sudden water evaporation is withdrawn from the melt, and it solidifies.

In the discontinuous or batch operation, this difficulty can be met by carrying out the pressure release slowly, in which process the pressure release time extends generally over several hours. In continuous processes the pressure release must necessarily be completed in a relatively short time. Because of the low heat conductivity of the melt, provisions of a special type are necessary for this purpose, as, for example, the providing of a spatially extended pressure gradient with large heat-exchanging surfaces, so that the necessary evaporation heat can be supplied from an external heating source. Various processes have been proposed in order to surmount the difficulties occurring in a continuous pressure release. It is a known practice, for example, to release the pressure of a melt which still contains about 15% of water, in stages, by pressing it out of the precondenser which is designated as reaction evaporator, into a long tube, whose cross section enlarges at spaced intervals. In another, technologically less expensive process, the melt flowing out under pressure is directly conducted onto a very hot metal surface of high heat-conductivity in the form of a thin, molten layer.

No matter what pressure release apparatus is chosen, the pressure release can be the better controlled as the water content of the melt which is fed to the reaction evaporator is lower. The more the water is to be vaporized from the melt in the reaction evaporator, however, the higher is the temperature of the melt at a given pressure in the reaction evaporator. With the simultaneously progressing polycondensation, the melting point of the polymer rises in leaps while the viscosity of the melt increases and its heat conductivity decreases. Since in the continuous process the aqueous solution of the starting material, containing proportionately much more water relative to the melt, has to be fed to the reaction evaporator in the same measure as melt is taken out of it, besides the problem of the pressure release there arises still another problem.

It is necessary to supply to the reaction evaporator, in which the melt is present under about 18 atmospheres excess pressure, an aqueous solution of the starting material continuously, whose boiling point at the pressure mentioned is lower than the melting point of the melt. The result is that the melt, which is already appreciably viscous and has low heat conductivity, solidifies at least in part. For example, the solution of the starting material introduced under pressure into the reaction evaporator may be a 60% solution of the salt of hexamethylene diamine and adipic acid, and the melt may have a temperature between 215 and 260° C. The higher is the temperature, the lower is the water content of the melt. As long as the temperature of the melt still lies relatively low—say, between 217 and 230°—and its water content is correspondingly high—say between 38 and 18% by weight—it is possible, without special measures, to allow to run into the reaction evaporator a solution of hexamethylene diamine adipic acid salt preheated to about 100° C. The pressure release of such a melt to normal pressure is then, however—as stated above—difficult; that is it can take place only gradually in an extremely expensive apparatus. For the final condensation, in turn, special apparatus units, often mechanically operated, are necessary, such as, for example, so-called "screw finishers," in order to remove the amounts of water present or developing. It would be desirable, therefore, to push the condensation in this first stage of the process as far as possible, so that the drawn-off melt can be released as simply and safely as possible to normal pressure and the end or final condensation can be completed, if possible, in collecting vessels without moving parts in as short as possible a time.

If, in line with this, the condensation is carried out in such a way that more solution water evaporates from the reaction evaporator, as, say, to a water content of about 5 to 6% by weight, then, under the conditions given above, that is, a pressure of 18 atmospheres excess pressure, the temperature must be raised to about 250° C. The polymerization degree of the melt, and, accordingly, also the melt temperature, then lie higher. If, to such a melt, adipic acid hexamethylene diamine salt solution of about 100° C. were fed, then there would be a solidifying of the melt and, thereby, interruption of the continuous process.

We have now found that all the above-described difficulties can be avoided if the aqueous solution of the dicarboxylic acid diamine salt is continuously heated in a throughput heater to a temperature which lies not more than 10° C. below the boiling temperature of the solution at a vapor pressure of the solution of 18 to 50 atmospheres gauge pressure. The heated solution thereupon under maintenance of the pressure and of the temperature is introduced continuously, in the form of fine jets, into the reaction evaporator, below the melt surface. The melt containing about 5–10% water is under 18 atmospheres gauge pressure and a temperature of about 245 to 255° C. Simultaneously, from the bottom of the reaction evaporator, melt which still contains about 5 to 10% by weight of water is withdrawn, released to atmospheric pressure and brought to completion of condensation in a manner in itself known.

The process is especially advantageous because the solution in the throughput heater is not only preheated, but is also condensed to such an extent that the concentration of free diamine is considerably lowered. A 60% hexamethylene diamine adipic acid salt solution at temperatures of about 210° C. stands in equilibrium with less than 1% by weight of free hexamethylene diamine.

The hexamethylene diamine losses can be still further reduced if, in the throughput heater, pressures are used which lie much higher than 18 atmospheres gauge pressure—as, for example, 30 to 50 atmospheres gauge pressure—whereby the vapor phase in the throughput heater practically disappears. The hexamethylene diamine lost diminishes, as the tests show, with the volume of the vapor phase.

It is not, therefore, expedient to overheat the salt solution appreciably before the entry into the reaction evaporator and thus to introduce a liquid-vapor mixture. Thereby, to be sure, the danger of solidification is diminished, but the hexamethylene diamine losses become so great that an end product is obtained with insufficient viscosity. The hexamethylene diamine loss could be compensated for by addition of hexamethylene diamine, but this would require additional devices and operations. Moreover, there would be the danger of overcompensation. If the resulting polycondensates are not consistent in their properties, an important advantage of the continuous process is lost.

Another essential feature of the process according to the invention is to be seen in the fact that the salt solution is introduced into the melt in the form of fine jets, as, for example, with use of capillaries. The introduced solution has, at the entry point into the melt situated in the reaction evaporator, a temperature of about 215° C. because of the boiling point equilibrium. In consequence of the high emergence speed of the solution from the capillaries, which should amount to at least 40 cm./sec., expediently to at least 100 cm./sec., the relatively colder solution fed is very quickly finely dispersed in the melt, so that a localized subcooling of the melt does not occur. The vapor bubbles formed during the heating of the solution and distributed over the entire volume bring about such an intensive mixing of the melt that, without additional agitators or the like, the necessary heat for vaporization of the water can be supplied by indirect heat exchange. By suitable positioning of the capillaries, moreover, a torque can be applied by the discharged capillary streams on the melt.

It is expedient to connect the capillary tubes to the feed system above the melt surface level. This guards against a vapor formation and a solidification inside the conduit at the boundary surface which would form between solution and melt.

If the process is conducted in the manner described above, the danger of solidifying and of a premature undesirable stabilization effect through diamine losses is virtually precluded. Since state of equilibrium mentioned above is established in less than 10 minutes, a staying time of the solution of abut 10 minutes in the throughput heater is sufficient.

The polyamide-forming monomer precursors which can be used in the practice of the invention preferably are an approximate equimolar mixture of hexamethylene diamine and adipic acid or the salt thereof (hexamethylene diamine adipate) although other aliphatic diamines ranging from 4–10 carbons and aliphatic dicarboxylic acids ranging from 4–12 carbons may be used, if desired.

For the execution of the process there is used expediently the apparatus shown in the drawing wherein:

The figure is a diagram of apparatus which may be used to practice the process of the invention.

This apparatus comprises a supply tank 1, in which the 60% diamine dicarboxylic acid salt solution is heated at normal pressure to about 95° C. From this supply tank the solution is pumped by means of a pump 2 via the pipes 3 into a throughput heater 4, in which, under a pressure of 18 to 50 atmospheres gauge pressure, it is brought to a temperature of 210 to 220° C. The conduits are equipped with a shutoff valve 5, a discharge valve 6 and a safety valve 7. The pressure can be read on the manometer 8, the temperatures on thermometer 9. The throughput heater 4 communicates via pipes 10 and a reducing valve 11 with one or more capillary tubes 12. Only one capillary tube is shown. The capillary extends to about the bottom of the reaction evaporator 13 and may be curved upward at its lower end, so that the solution introduced emerges in the form of a finely directed jet and is dispersed under vapor development in the melt. The passage 10 is expediently constricted already above the immersion point 14 into the melt to the diameter of the capillary. Thereby the danger of blockage of the capillary is excluded. The aforesaid melt still contains about 5–10% water.

The maximum inner diameter of the capillary tubes ordinarily will not exceed about 5 mm. There is no critical minimum inner diameter although about 0.5 mm. is the ordinary practical minimum. The inner diameter is chosen so that the jet velocity of the solution is at least 40 cm. per second. Supplemental heat for the melt in the reaction evaporator may be supplied by any suitable indirect heat exchange means such as a heating jacket around the vessel 13 or heat exchange coils or the like inside the vessel 13. From the sump of the reaction evaporator the melt, which still has a water content of 5 to 10%, emerges at 15 directly into apparatus (not represented) in which the release to normal pressure takes place. As pressure release device any serviceable device can be used. The reaction evaporator 13 is equipped with a level indicator 16 and a thermometer 17. The pressure regulation is accomplished by way of the valve 18, through which the steam escapes and is conducted for condensation into a cooler 19. Through the duct 20 nitrogen can be introduced for washing of the reaction evaporator.

With the aid of a specific example, the process and apparatus of the invention will be further explained.

*Example*

At the start of the process, a thirty liter autoclave 13 is washed with nitrogen, then charged with 14 kg. of a 60% aqueous adipic hexamethylene diamine salt solution heated to 95° C., and thereupon heated. At a temperature of the reaction mass of 215° C., the pressure of 18 atmospheres gauge pressure is reached, and the distillation of water begins. The solution to be fed is brought in the throughput heater 4 to a temperature of 210 to 215° C. at a pressure of about 20 atmospheres gauge pressure. As soon as the temperature of the melt has risen to 220° C., the solution coming from the throughput heater is fed into the autoclave. The hourly flow rate of solution is at first set at 2 kg. of solution. When, after about 30 minutes, the temperature of the melt, at full heating performance of the autoclave, has risen to 235° C., the feed of the salt solution is raised to 5 kg./hr. as the temperature of the melt—i.e., within a further 25 minutes—reaches 250° C. The feed of the monomer solution is accomplished through the capillary 12, which has an inside diameter of 2 mm. The linear emergence velocity from this capillary amounts to 40 cm./sec. As soon as the melt temperature is established constantly at 250° C., the discharge of the begins from the sump of the reaction evaporator at 15. The discharge is regulated by the level indicator 16 in the reaction evaporator. Thereby, the conditions are achieved for the continuous operation. At an hourly feed of 5 kg. of solution there are supplied to the pressure release apparatus about 2.75 kg. of melt, and 2.25 kg. of water per hour are distilled off. The daily throughput in the continuous manner of operation described (including the starting time) is 72 kg. of hexamethylene diamine adipic acid salt corresponds approximately to twice the daily throughput of a similar autoclave with discontinuous operation in charges.

From the table it is apparent that the relative viscosity of the polyamide, measured in a 1% solution of a 90% formic acid at 25° C. in a capillary viscosimeter remains effectively constant over the entire duration of the test. It corresponds to the reaction-kinetic equilibrium value to be expected, so that the intermixing in the reaction evaporator is to be regarded as sufficient. The water distilled off from the reaction evaporator was examined for its content of total bases. The measurement values converted to hexamethylene diamine (HMD) are likewise presented in the table. Although special precautionary measures, such as distilling off of the water over a column, were not employed, the hexamethylene diamine contents of the water do not lie higher than in a discontinuous autoclave process.

| Reaction time in hours | Relative viscosity | HMD contents of the autoclave distillate in percent by weight |
|---|---|---|
| 4 | 1.32 | 0.15 |
| 7 | 1.32 | 0.15 |
| 9 | 1.32 | 0.20 |
| 11 | 1.30 | 0.20 |
| 13 | 1.33 | 0.21 |
| 15 | 1.32 | 0.23 |
| 17 | 1.34 | 0.20 |
| 19 | 1.33 | 0.23 |
| 21 | 1.33 | 0.22 |

From the amount of the adipic acid hexamethylene diamine salt solution supplied during the continuous process, the amount of chemically split-off water (about 97% of the theoretically splittable amount) and the distillate amount there results a relatively constant water content of the melt of 5 to 6% by weight.

Two control experiments were carried out, in each of which a 60% aqueous hexamethylene diamine adipic acid salt solution of 95° C. was introduced through a tube of 8 mm. inside diameter (under conditions otherwise the same) above the melt surface into the autoclave. In the first control experiment the solution was fed into the middle of the autoclave, and in the second experiment over the autoclave wall heated to 280 to 300° C. Both experiments began with the introduction of the salt solution already at a melt temperature of 215° C., that is, immediately after reaching a pressure of 18 atmospheres gauge pressure. After salt solution had been introduced at a rate of only 3 kg./hr. under 18 atmospheres gauge pressure for two hours, the feed of the solution was interrupted, and the melt was condensed to conclusion in the manner usual in batch operation, by release of the pressure and raising of the melt temperature to 275° C. in the autoclave with total reaction time of about 6 hours. The melt was then drawn off. The melt had a relative viscosity of 2.2. In both cases, after cooling the autoclave contained strong so-called bridges of solid polyamide, whose solution viscosity amouned to as much as 3.5. Even the after-condensation of about 3 hours, with the raising of the melt temperature to 275° C. had not sufficed to melt the solid surface layers formed on introduction of the salt solution. The hexamethylene diamine losses were about 30% higher than in normal batch operation.

The procedure of the preceding example can be used with other polycondensable polyamide precursors such as sebacic acid and hexamethylene diamine or the salt thereof, octamethylene diamine and adipic acid or the salt thereof, butylene diamine and adipic acid or the salt thereof, and the like.

The invention is hereby claimed as follows:

1. A process for the continuous production of polyamides by the polycondensation of a member selected from the group consisting of (a) a mixture of an aliphatic dicarboxylic acid having 4 to 12 carbon atoms and an aliphatic diamine having 4 to 10 carbon atoms and (b) a salt of an aliphatic dicarboxylic acid having 4 to 12 carbon atoms and an aliphatic diamine having 4 to 10 carbon atoms which comprises heating an aqueous solution of said member to a temperature within 10° C. of the boiling temperature of said solution under a vapor pressure of said solution in the range of 18 to 50 atmospheres gauge pressure, introducing said heated solution under maintenance of said temperature and pressure into a body of polyamide melt containing about 5–10% water beneath the surface thereof in the form of continuous, fine jet streams of said solution with velocities at the points of introduction thereof into said body of at least 40 cm. per second, said body of polyamide melt being maintained at a pressure of 18 atmospheres gauge and a temperature of 245–255° C., withdrawing from said body the water vapor formed through vaporization of the water of said solution in said body, and withdrawing from the lower portion of said body of polyamide melt a part of said melt containing about 5–10% water.

2. The process of claim 1 wherein said jet streams at the point of introduction into said body have a velocity of at least 100 cm. per second.

3. A process for the continuous production of polyamides by the polycondensation of a salt of hexamethylene diamine and adipic acid which comprises heating an aqueous solution of said salt to a temperature within 10° C. of the boiling temperature of said solution under a vapor pressure of said solution in the range of 18 to 50 atmospheres gauge pressure, introducing said heated solution under maintenance of said temperature and pressure into a body of polyamide melt containing about 5–10% water beneath the surface thereof in the form of continuous, fine jet streams of said solution with velocities at the points of introduction thereof into said body of at least 40 cm. per second, said body of polyamide melt being maintained at a pressure of 18 atmospheres gauge and a temperature of 245–255° C., withdrawing from said body the water vapor formed through vaporization of the water of said solution in said body, and withdrawing from the lower portion of said body of polyamide melt a part of said melt containing about 5–10% water.

4. The process of claim 3 wherein said jet streams at the point of introduction into said body have a velocity of at least 100 cm. per second.

References Cited by the Examiner

UNITED STATES PATENTS

| 1,990,113 | 2/1935 | Burghart | 23—260 |
| 2,204,777 | 6/1940 | Smith | 23—260 |
| 2,562,796 | 7/1951 | Koch | 260—78 |
| 2,625,536 | 1/1953 | Kirby | 260—78 |
| 2,831,834 | 4/1958 | Magat | 260—78 |
| 2,923,699 | 2/1960 | Indest et al. | 260—78 |

WILLIAM H. SHORT, *Primary Examiner.*

JOSEPH R. LIBERMAN, *Examiner.*

H. D. ANDERSON, *Assistant Examiner.*